US012768304B2

(12) United States Patent
Hanrahan

(10) Patent No.: US 12,768,304 B2
(45) Date of Patent: Oct. 20, 2026

(54) SELECTIVE POWER DISTRIBUTION FOR AN AIRCRAFT PROPULSION SYSTEM

(71) Applicant: RTX Corporation, Farmington, CT (US)

(72) Inventor: Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 19 days.

(21) Appl. No.: 18/374,985

(22) Filed: Sep. 29, 2023

(65) Prior Publication Data

US 2025/0109712 A1 Apr. 3, 2025

(51) Int. Cl.
*F02C 7/36* (2006.01)

(52) U.S. Cl.
CPC .......... *F02C 7/36* (2013.01); *F05D 2220/323* (2013.01); *F05D 2260/40311* (2013.01)

(58) Field of Classification Search
CPC ................. F02C 7/36; F05D 2220/323; F05D 2260/40311
See application file for complete search history.

(56) References Cited

U.S. PATENT DOCUMENTS 3,611,834 A * 10/1971 Dison ....................... F02C 7/36 475/343
3,678,690 A 7/1972 Shohet
4,251,987 A 2/1981 Adamson
4,651,521 A 3/1987 Ossi
4,660,439 A * 4/1987 Hiraiwa .................. F16H 3/663 475/284
4,791,783 A 12/1988 Neitzel
4,936,748 A 6/1990 Adamson
(Continued)

FOREIGN PATENT DOCUMENTS

CN 111279060 B 3/2023
CN 107856488 B 12/2023
(Continued)

OTHER PUBLICATIONS

Leibach, Heinrich, "Triebwekrsanordnung Guer Kurz-Oder Senkrechstart-Flugzeuge Mit Hubgeblaese", DE 1119675, Dec. 14, 1961 (Year: 1961).*
(Continued)

*Primary Examiner* — Nathaniel E Wiehe
*Assistant Examiner* — Joshua R Beebe
(74) *Attorney, Agent, or Firm* — Getz Balich LLC

(57) ABSTRACT

An aircraft assembly includes a geartrain, a first propulsor rotor and a rotating assembly. The geartrain includes a first gear system and a second gear system. The first gear system includes a first sun gear, a first ring gear, a plurality of first intermediate gears and a first carrier. The first intermediate gears are radially between and meshed with the first sun gear and the first ring gear. The second gear system includes a second sun gear, a second ring gear, a plurality of second intermediate gears and a second carrier. The second sun gear is rotatable about the axis with the first sun gear. The second intermediate gears are radially between and meshed with the second sun gear and the second ring gear. The second carrier is coupled to the first ring gear. The rotating assembly is configured to drive rotation of the first propulsor rotor through the geartrain.

16 Claims, 8 Drawing Sheets

(56) References Cited

U.S. PATENT DOCUMENTS

| | | | | |
|---|---|---|---|---|
| 4,997,414 | A | 3/1991 | Camara | |
| 5,209,428 | A | 5/1993 | Bevilaqua | |
| 5,452,988 | A | 9/1995 | Short | |
| 6,148,605 | A * | 11/2000 | Lardellier | F01D 1/30 416/169 R |
| 6,269,627 | B1 | 8/2001 | Freese | |
| 6,270,037 | B1 | 8/2001 | Freese | |
| 6,672,049 | B2 * | 1/2004 | Franchet | F02K 3/06 60/39.162 |
| 7,481,062 | B2 | 1/2009 | Gaines | |
| 7,752,836 | B2 | 7/2010 | Orlando | |
| 9,017,028 | B2 | 4/2015 | Fabre | |
| 10,138,757 | B2 | 11/2018 | Witlicki | |
| 10,215,054 | B2 | 2/2019 | Anglin | |
| 10,221,771 | B2 | 3/2019 | Roberge | |
| 10,337,409 | B2 | 7/2019 | Bedrine | |
| 10,578,028 | B2 | 3/2020 | Becker, Jr. | |
| 10,663,054 | B2 | 5/2020 | Gravina | |
| 10,669,946 | B2 * | 6/2020 | Sheridan | F02K 3/072 |
| 10,822,101 | B2 | 11/2020 | Murrow | |
| 10,876,411 | B2 | 12/2020 | Ramirez | |
| 10,914,234 | B1 | 2/2021 | Steven | |
| 10,954,813 | B2 | 3/2021 | Wuestenberg | |
| 10,968,748 | B2 | 4/2021 | Ramirez | |
| 11,015,522 | B2 * | 5/2021 | Poulin | F02K 3/06 |
| 11,015,533 | B2 | 5/2021 | Sheridan | |
| 11,060,587 | B1 | 7/2021 | Kobayashi | |
| 11,073,160 | B2 | 7/2021 | Murugan | |
| 11,077,949 | B2 | 8/2021 | Behrens | |
| 11,168,616 | B2 | 11/2021 | Kupratis | |
| 11,186,378 | B2 | 11/2021 | Dubreuil | |
| 11,199,103 | B2 | 12/2021 | Wolfer | |
| 11,447,035 | B1 * | 9/2022 | Hull | H02J 7/0029 |
| 11,745,888 | B2 | 9/2023 | Harvey | |
| 11,815,145 | B2 | 11/2023 | Huschenhoefer | |
| 11,891,967 | B2 | 2/2024 | Yesilcimen | |
| 2003/0049118 | A1 | 3/2003 | Bruno | |
| 2007/0022735 | A1 * | 2/2007 | Henry | F02K 3/04 60/39.162 |
| 2008/0060341 | A1 | 3/2008 | Loisy | |
| 2009/0320491 | A1 | 12/2009 | Copeland | |
| 2012/0133155 | A1 | 5/2012 | Sorg | |
| 2012/0177493 | A1 | 7/2012 | Fabre | |
| 2014/0010652 | A1 | 1/2014 | Suntharalingam | |
| 2014/0290265 | A1 | 10/2014 | Ullyott | |
| 2014/0364265 | A1 | 12/2014 | Bentgen | |
| 2015/0011354 | A1 * | 1/2015 | Fabre | F02C 7/06 475/331 |
| 2015/0274287 | A1 | 10/2015 | Robertson | |
| 2016/0076393 | A1 | 3/2016 | Sheridan | |
| 2016/0185460 | A1 | 6/2016 | Cedoz | |
| 2016/0195096 | A1 | 7/2016 | Otto | |
| 2016/0229531 | A1 | 8/2016 | Robertson | |
| 2016/0356225 | A1 | 12/2016 | Sheridan | |
| 2017/0051679 | A1 | 2/2017 | Becker, Jr. | |
| 2017/0114661 | A1 * | 4/2017 | Schwarz | F01D 25/20 |
| 2017/0314411 | A1 * | 11/2017 | Roberge | F04D 29/325 |
| 2018/0009536 | A1 | 1/2018 | Christopherson | |
| 2018/0080383 | A1 * | 3/2018 | Snape | F02C 6/08 |
| 2018/0135512 | A1 | 5/2018 | Poulin | |
| 2018/0266316 | A1 | 9/2018 | Soulat | |
| 2018/0328289 | A1 | 11/2018 | Madge | |
| 2019/0061924 | A1 | 2/2019 | Kita | |
| 2019/0382123 | A1 | 12/2019 | Schwarz | |
| 2020/0017229 | A1 | 1/2020 | Steinert | |
| 2020/0070990 | A1 | 3/2020 | Harvey | |
| 2020/0088053 | A1 | 3/2020 | Fiore | |
| 2020/0108937 | A1 | 4/2020 | Behrens | |
| 2020/0182158 | A1 | 6/2020 | Kupratis | |
| 2020/0191062 | A1 | 6/2020 | Sheridan | |
| 2020/0240427 | A1 | 7/2020 | Teuber | |
| 2020/0307812 | A1 | 10/2020 | Dubreuil | |
| 2020/0307818 | A1 | 10/2020 | Dubreuil | |
| 2020/0340406 | A1 | 10/2020 | Maljean | |
| 2020/0354068 | A1 | 11/2020 | Razak | |
| 2020/0400077 | A1 | 12/2020 | Redford | |
| 2021/0054784 | A1 | 2/2021 | O'Flarity | |
| 2021/0078700 | A1 | 3/2021 | Klemen | |
| 2021/0087977 | A1 | 3/2021 | Becoulet | |
| 2021/0179286 | A1 | 6/2021 | Harvey | |
| 2021/0229796 | A1 | 7/2021 | Mitrovic | |
| 2021/0317800 | A1 | 10/2021 | Yesilcimen | |
| 2022/0235699 | A1 | 7/2022 | Desjardins | |
| 2022/0298974 | A1 * | 9/2022 | Desjardins | F16H 57/0404 |
| 2023/0228216 | A1 | 7/2023 | Miller | |
| 2023/0228231 | A1 | 7/2023 | Miller | |
| 2023/0382548 | A1 | 11/2023 | Hanrahan | |
| 2023/0382549 | A1 | 11/2023 | Hanrahan | |
| 2023/0383700 | A1 | 11/2023 | Hanrahan | |
| 2024/0052784 | A1 | 2/2024 | Hanrahan | |
| 2024/0060453 | A1 | 2/2024 | Hanrahan | |
| 2024/0077033 | A1 | 3/2024 | Hanrahan | |
| 2024/0077034 | A1 | 3/2024 | Hanrahan | |

FOREIGN PATENT DOCUMENTS

| | | | |
|---|---|---|---|
| DE | 1119675 | B | 12/1961 |
| EP | 2535528 | B1 | 4/2021 |
| EP | 4365429 | A1 | 5/2024 |
| GB | 1439988 | A | 6/1976 |
| WO | 2016090390 | A1 | 6/2016 |

OTHER PUBLICATIONS

Hehenberger, et al. "Powertrain", Austria, AT 516038 B2, Feb. 15, 2016 (Year: 2016).*

"Overview of Variable-Speed Power-Turbine Research", https://core.ac.uk/download/pdf/10560017.pdf, Aug. 30, 2019.

"Overview of Variable-Speed Power-Turbine Research", https://www.science.gov/topicpages/v/variable-speed+power +turbine, Jan. 1, 2011.

"RVLT TC1.1: Variable Speed Power Turbine Tech Demo", https://techport.nasa.gov/view/93071, Jul. 21, 2021.

Ashlie Flegel, "Aerodynamic Measurements of a Variable-Speed Power-Turbine Blade Section in a Transonic Turbine Cascade" https://engagedscholarship.csuohio.edu/cgi/viewcontent.cgi?article=1852&context=etdarchive, May 2007.

Flegel-McVetta et al. "Aerodynamic Measurements of a Variable-Speed Power-Turbine Blade Section in a Transonic Turbine Cascade at Low Inlet Turbulence", NASA/TM-2013-218069, Aug. 2013.

EP Search Report for EP Patent Application No. 24203685.3 dated Mar. 4, 2025.

* cited by examiner

SELECTIVE POWER DISTRIBUTION FOR AN AIRCRAFT PROPULSION SYSTEM

BACKGROUND OF THE DISCLOSURE

1. Technical Field

This disclosure relates generally to an aircraft propulsion system and, more particularly, to a geartrain for the aircraft propulsion system.

2. Background Information

Various types and configurations of geartrains for an aircraft propulsion system are known in the art for an aircraft. While these known aircraft propulsion system geartrains have various benefits, there is still room in the art for improvement.

SUMMARY OF THE DISCLOSURE

According to an aspect of the present disclosure, an assembly is provided for an aircraft. This aircraft assembly includes a geartrain, a first propulsor rotor and a rotating assembly. The geartrain includes a first gear system and a second gear system. The first gear system includes a first sun gear, a first ring gear, a plurality of first intermediate gears and a first carrier. The first sun gear is rotatable about an axis. The first ring gear circumscribes the first intermediate gears. The first intermediate gears are radially between and meshed with the first sun gear and the first ring gear. Each of the first intermediate gears is rotatably mounted to the first carrier. The second gear system includes a second sun gear, a second ring gear, a plurality of second intermediate gears and a second carrier. The second sun gear is rotatable about the axis with the first sun gear. The second ring gear circumscribes the second intermediate gears and is rotatable about the axis. The second intermediate gears are radially between and meshed with the second sun gear and the second ring gear. Each of the second intermediate gears is rotatably mounted to the second carrier. The second carrier is coupled to the first ring gear. The first propulsor rotor is coupled to the second ring gear. The rotating assembly is coupled to the first sun gear. The rotating assembly includes a turbine rotor. The rotating assembly is configured to drive rotation of the first propulsor rotor through the geartrain.

According to another aspect of the present disclosure, another assembly is provided for an aircraft. This aircraft assembly includes a geartrain, a first propulsor rotor and a rotating assembly. The geartrain includes a first gear system and a second gear system. The first gear system includes a first sun gear, a first ring gear, a plurality of first intermediate gears and a first carrier. The first sun gear is rotatable about an axis. The first ring gear circumscribes the first intermediate gears. The first intermediate gears are radially between and meshed with the first sun gear and the first ring gear. Each of the first intermediate gears is rotatably mounted to the first carrier. The second gear system includes a second sun gear, a second ring gear, a plurality of second intermediate gears and a second carrier. The second sun gear is rotatable about the axis. The second ring gear circumscribes the second intermediate gears and is rotatable about the axis. The second intermediate gears are radially between and meshed with the second sun gear and the second ring gear. Each of the second intermediate gears is rotatably mounted to the second carrier. The second carrier is coupled to the first ring gear. The first propulsor rotor is coupled to the second ring gear. The rotating assembly includes a turbine rotor. The rotating assembly is configured to drive rotation of the first propulsor rotor through the geartrain where the first sun gear and the second sun gear rotate at a common rotational velocity as the turbine rotor.

According to still another aspect of the present disclosure, another assembly is provided that includes a geartrain, a power output and a power input. The geartrain includes a first gear system and a second gear system. The first gear system includes a first sun gear, a first ring gear, a plurality of first intermediate gears and a first carrier. The first sun gear is rotatable about an axis. The first ring gear circumscribes the first intermediate gears. The first intermediate gears are radially between and meshed with the first sun gear and the first ring gear. Each of the first intermediate gears is rotatably mounted to the first carrier. The second gear system includes a second sun gear, a second ring gear, a plurality of second intermediate gears and a second carrier. The second sun gear is rotatable about the axis. The second ring gear circumscribes the second intermediate gears and is rotatable about the axis. The second intermediate gears are radially between and meshed with the second sun gear and the second ring gear. Each of the second intermediate gears is rotatably mounted to the second carrier. The second carrier is coupled to the first ring gear. The power output is coupled to the geartrain through the second ring gear. The power input is coupled to the geartrain through the first sun gear and/or the second sun gear. The power input is configured to drive rotation of the power output through the geartrain.

The assembly may also include a drivetrain comprising the geartrain. The first ring gear may be configured to rotate about the axis during a first mode. The first carrier may be configured to rotate about the axis during a second mode. The drivetrain may be configured to stop rotation of the first carrier during the first mode. The drivetrain may be configured to stop rotation of the first ring gear during the second mode. The power input may be configured to drive the rotation of the power output through the geartrain during the first mode and the second mode.

The power output may be configured as or otherwise include a bladed rotor for an aircraft propulsion system.

The rotating assembly may also include a shaft independently coupled to the first sun gear and the second sun gear.

The assembly may also include a second propulsor rotor. The rotating assembly may be configured to drive rotation of the second propulsor rotor independent of the geartrain. The first ring gear may be rotatable about the axis.

The assembly may also include a lock device configured to lock rotation of the first ring gear about the axis.

The lock device may be configured as or otherwise include a splined coupling.

The assembly may also include a brake configured to brake rotation of the first ring gear about the axis.

The brake may be configured as or otherwise include a disk brake.

The first carrier may be rotatable about the axis.

The assembly may also include a lock device configured to lock rotation of the first carrier about the axis.

The lock device may be configured as or otherwise include a splined coupling.

The assembly may also include a brake configured to brake rotation of the first carrier about the axis.

The brake may be configured as or otherwise include a disk brake.

The assembly may also include an auxiliary turbine. The auxiliary turbine may include an auxiliary turbine rotor. The auxiliary turbine rotor may be coupled to and configured to drive rotation of the second ring gear.

The rotating assembly may be independently coupled to the first sun gear and the second sun gear.

The rotating assembly may be configured to drive rotation of the first sun gear and the second sun gear at a common rotational velocity as the turbine rotor.

The assembly may also include a second propulsor rotor rotatable with the rotating assembly. The rotating assembly may be configured to drive rotation of the second propulsor rotor.

The rotating assembly may be coupled to the second propulsor rotor independent of the geartrain.

The axis may be a first axis. The first propulsor rotor may be rotatable about the first axis. The second propulsor rotor may be rotatable about a second axis that is angularly offset from the first axis.

The assembly may also include an engine core. The engine core may include a compressor section, a combustor section, a turbine section and the rotating assembly. The turbine section may include the turbine rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
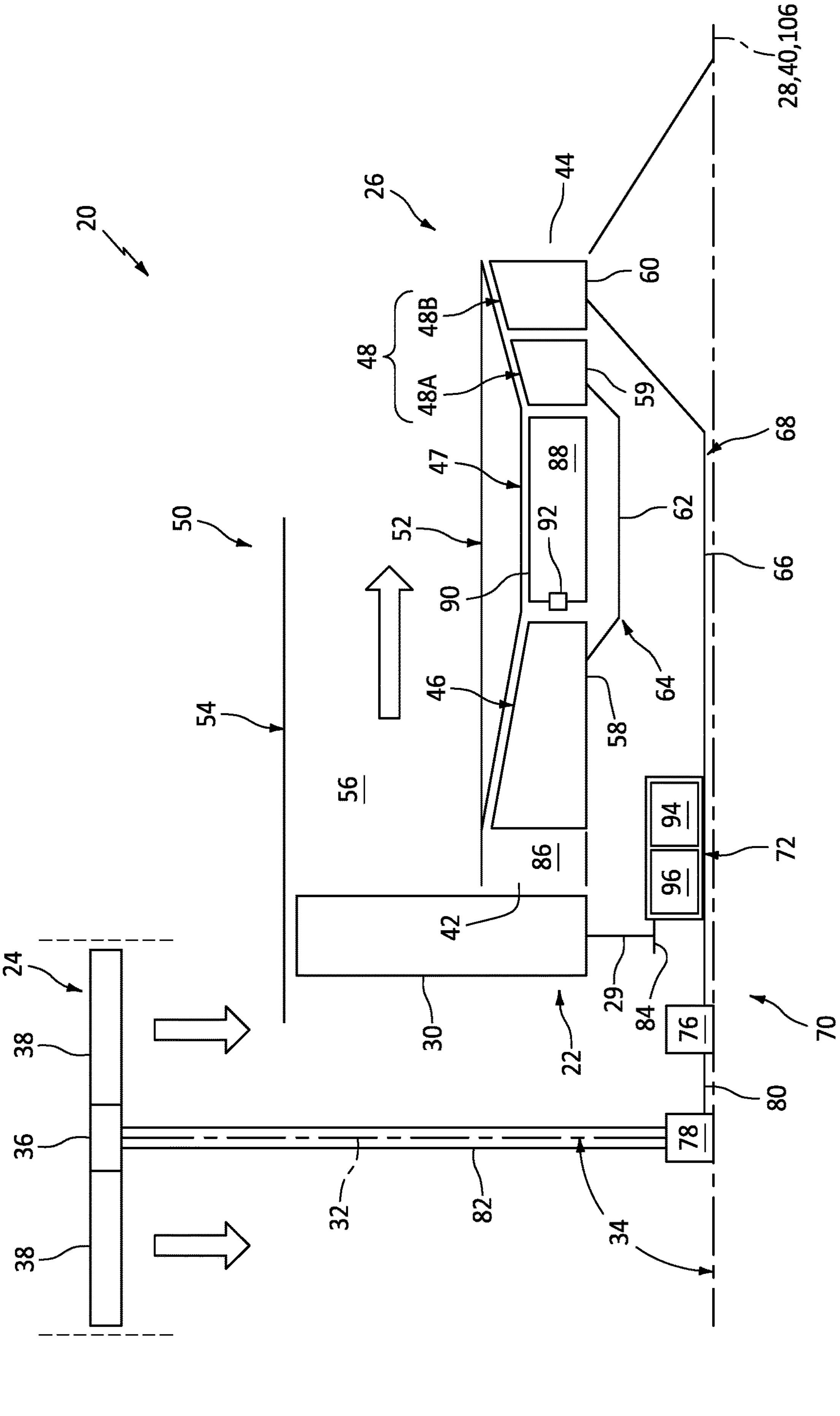
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle or system. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal flight mode (e.g., a forward flight mode) where the first direction propulsion is substantially horizontal propulsive thrust; e.g., within five degrees (5°), ten degrees (10°), etc. of a horizontal axis. The second mode may be a vertical flight and/or hover mode where the second direction propulsion is substantially vertical propulsive lift; e.g., within five degrees (5°), ten degrees (10°), etc. of a vertical axis. The aircraft propulsion system 20, of course, may also be configured to generate both the first direction propulsion (e.g., horizontal propulsion) and the second direction propulsion (e.g., vertical propulsion) during a third mode (e.g., a transition mode) of operation.

The aircraft propulsion system 20 of FIG. 1 includes one or more bladed propulsor rotors such as, for example, at least one bladed first propulsor rotor 22 and at least one bladed second propulsor rotor 24. The aircraft propulsion system 20 of FIG. 1 also includes a gas turbine engine with a core 26 configured to rotatably drive the one or more propulsor rotors—the first propulsor rotor 22 and/or the second propulsor rotor 24.

The first propulsor rotor 22 may be configured as a ducted rotor such as a fan rotor. Of course, in other embodiments, the first propulsor rotor 22 may alternatively be configured as an open rotor (e.g., an un-ducted rotor) such as a propeller rotor, a pusher fan rotor or the like. The first propulsor rotor 22 of FIG. 1 is rotatable about a first rotor axis 28. This first rotor axis 28 is an axial centerline of the first propulsor rotor 22 and may be horizontal when the aircraft is on ground and/or during level aircraft flight. The first propulsor rotor 22 includes at least a first rotor disk 29 (or a hub) and a plurality of first rotor blades 30 (one visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground and/or during level aircraft flight. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 (or a hub) and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 from a forward, upstream airflow inlet 42 into the engine core 26 to an aft, downstream combustion products exhaust 44 from the engine core 26. The core axis 40 may be an axial centerline of the engine core 26 and may be horizontal when the aircraft is on the ground and/or during level aircraft flight. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B may be arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a (e.g., annular) bypass flowpath 56 radially between the inner case 52 and the outer case 54.

Each of the engine sections 46, 48A, 48B includes a bladed rotor 58-60 within that respective engine section 46, 48A, 48B. Each of these engine rotors 58-60 includes a plurality of rotor blades arranged circumferentially around and connected to one or more respective rotor disks (or hubs). The rotor blades, for example, may be formed integral with or mechanically fastened, welded, brazed and/or otherwise attached to the respective rotor disk(s) (or hub(s)).

The compressor rotor 58 is connected to the HPT rotor 59 through a high speed shaft 62. At least (or only) these engine components 58, 59 and 62 collectively form a high speed rotating assembly 64; e.g., a high speed spool. This high speed rotating assembly 64 is rotatable about the core axis 40. The LPT rotor 60 is connected to a low speed shaft 66. At least (or only) these engine components 60 and 66 collectively form a low speed rotating assembly 68; e.g., a low speed spool. This low speed rotating assembly 68 is rotatable about the core axis 40. The low speed rotating assembly 68 and, more particularly, its low speed shaft 66 may project axially through a bore of the high speed rotating assembly 64 and its high speed shaft 62.

The aircraft propulsion system 20 of FIG. 1 and its turbine engine include a drivetrain 70 that couples the low speed rotating assembly 68 to the first propulsor rotor 22 and that couples the low speed rotating assembly 68 to the second propulsor rotor 24. The drivetrain 70 of FIG. 1 includes a geartrain 72, a transmission 76 and a gearing 78; e.g., bevel gearing. The drivetrain 70 of FIG. 1 also includes one or more shafts 80 and 82 and/or other intermediate torque transmission devices for coupling the low speed rotating assembly 68 and its low speed shaft 66 to the second propulsor rotor 24. The drivetrain 70 may also include one or more intermediate torque transmission devices for coupling the geartrain 72 to the first propulsor rotor 22; e.g., a first propulsor shaft 84.

An input into the geartrain 72 is coupled to the low speed rotating assembly 68 and its low speed shaft 66, where the low speed rotating assembly 68 forms a power input for the geartrain 72. An output from the geartrain 72 is coupled to the first propulsor rotor 22 through the first propulsor shaft 84, where the first propulsor rotor 22 forms a power output (e.g., load) for the geartrain 72.

An input into the transmission 76 may be coupled to the low speed rotating assembly 68 independent of the geartrain 72. The low speed rotating assembly 68, for example, may be coupled to the input of the geartrain 72 and the input of the transmission 76 in parallel. The input of the transmission 76 of FIG. 1, in particular, is (e.g., directly or indirectly) connected to the LPT rotor 60 through the low speed shaft 66; e.g., without passing through the geartrain 72. An output from the transmission 76 is connected to an input into the gearing 78 through the transmission output shaft 80.

The transmission 76 may be configured to selectively couple (e.g., transfer mechanical power between) the low speed rotating assembly 68 and the transmission output shaft 80. During the first mode of operation, for example, the transmission 76 may be configured to decouple the low speed rotating assembly 68 from the transmission output shaft 80, thereby decoupling the low speed rotating assembly 68 from the second propulsor rotor 24. During the second mode of operation (and the third mode of operation), the transmission 76 may be configured to couple the low speed rotating assembly 68 with the transmission output shaft 80, thereby coupling the low speed rotating assembly 68 with the second propulsor rotor 24. The transmission 76 may be configured as a clutched transmission or a clutchless transmission.

An output from the gearing 78 is connected to the second propulsor rotor 24 through the second propulsor shaft 82. This gearing 78 provides a coupling between the transmission output shaft 80 rotating about the axis 28, 40 and the second propulsor shaft 82 rotating about the second rotor axis 32. The gearing 78 may also provide a speed change mechanism between the transmission output shaft 80 and the second propulsor shaft 82. The gearing 78, however, may alternatively provide a 1:1 rotational coupling between the transmission output shaft 80 and the second propulsor shaft 82 such that these shafts 80 and 82 rotate at a common (e.g., the same) rotational velocity. Furthermore, in some embodiments, the gearing 78 and the transmission output shaft 80 may be omitted where the functionality of the gearing 78 is integrated into the transmission 76. In still other embodiments, the transmission 76 may be omitted where decoupling of the second propulsor rotor 24 is not required and/or where an optional additional speed change between the low speed rotating assembly 68 and the second propulsor rotor 24 is not required.

During operation of the aircraft propulsion system 20, air enters the engine core 26 through the core inlet 42. This air is directed into a (e.g., annular) core flowpath 86, which core flowpath 86 extends sequentially through the compressor section 46, the combustor section 47, the HPT section 48A and the LPT section 48B from the core inlet 42 to the core exhaust 44. The air within this core flowpath 86 may be referred to as core air.

The core air is compressed by the compressor rotor 58 and directed into a (e.g., annular) combustion chamber 88 of a (e.g., annular) combustor 90 in the combustor section 47. Fuel is injected into the combustion chamber 88 through one or more fuel injectors 92 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating assembly 64 and its compressor rotor 58. The rotation of the LPT rotor 60 drives rotation of the low speed rotating assembly 68. The rotation of the low speed rotating assembly 68 drives rotation of the first propulsor rotor 22 through the geartrain 72 during one or more modes of operation; e.g., the first, the second and the third modes of operation. The rotation of the low speed rotating assembly 68 drives rotation of the second propulsor rotor 24 (e.g., independent of the geartrain 72) during one or more modes of operation; e.g., the second and the third modes of operation. During the first mode of operation, the transmission 76 may decouple the low speed rotating assembly 68 from the second propulsor rotor 24 such that the low speed rotating assembly 68 does not drive rotation of the second propulsor rotor 24. The second propulsor rotor 24 may thereby be stationary (or windmill) during the first mode of operation.

During the first and the third modes of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During the second and the third modes of operation, the rotation of the second propulsor rotor 24 propels additional air (separate from the core air and the bypass air) to provide the second direction propulsion; e.g., vertical lift. The aircraft may thereby takeoff, land and/or otherwise hover during the second and the third modes of operation, and the aircraft may fly forward or otherwise move during the first and the third modes of operation. The bypass air may also flow through the bypass flowpath 56 during the second and the third modes of operation; however, a quantity of the bypass air flowing through the bypass flowpath 56 during the second mode of operation may be de minimis as described below in further detail.

Figure 2:
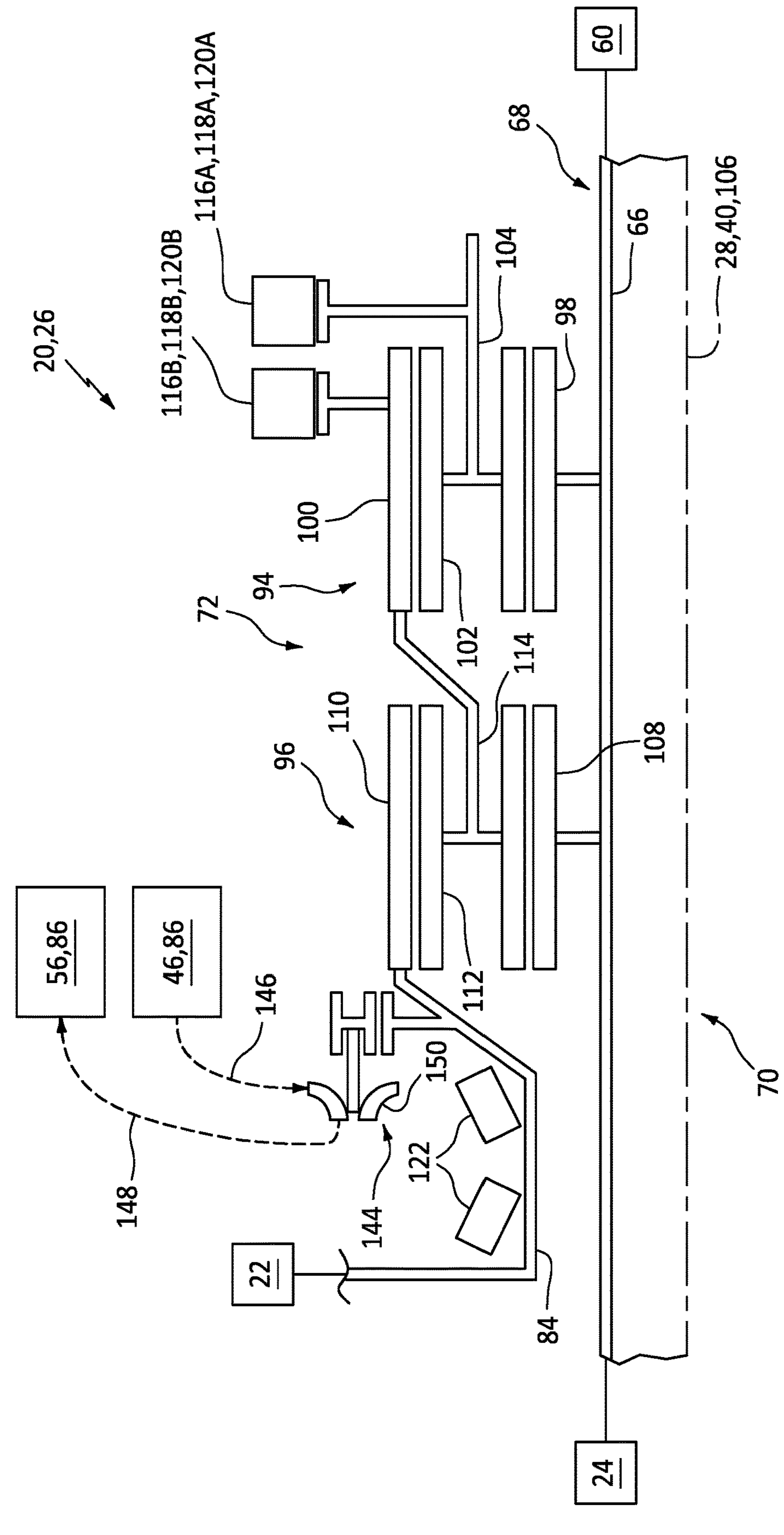
FIG. 2 is a schematic illustration of a portion of a drivetrain with a geartrain.
Figure 3:
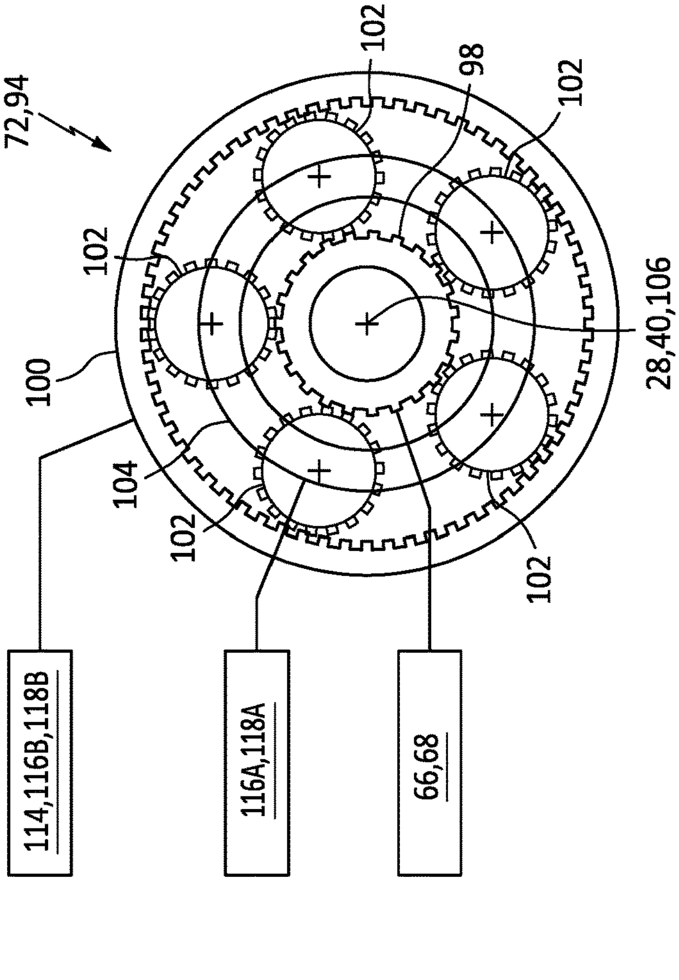
FIG. 3 is a schematic illustration of a first gear system of the geartrain coupled with various components of the aircraft propulsion system.

Referring to FIG. 2, the geartrain 72 may include multiple (e.g., epicyclic) interconnected gear systems 94 and 96. Referring to FIGS. 2 and 3, the first gear system 94 includes a first sun gear 98, a first ring gear 100, a plurality of first intermediate gears 102 and a first carrier 104. The first sun gear 98 is rotatable about a rotational axis 106 of the geartrain 72, which rotational axis 106 may be parallel (e.g., coaxial) with the axis 28, 40. The first ring gear 100 circumscribes the first sun gear 98 and the first intermediate gears 102. The first ring gear 100 is rotatable about the axis 28, 40, 106. The first intermediate gears 102 are arranged circumferentially about the axis 28, 40, 106 and the first sun gear 98 in an array. Each of the first intermediate gears 102 is disposed radially between and meshed with the first sun gear 98 and the first ring gear 100. Each of the first intermediate gears 102 is rotatably mounted to the first carrier 104. The first carrier 104 is rotatable about the axis 28, 40, 106.

Figure 4:
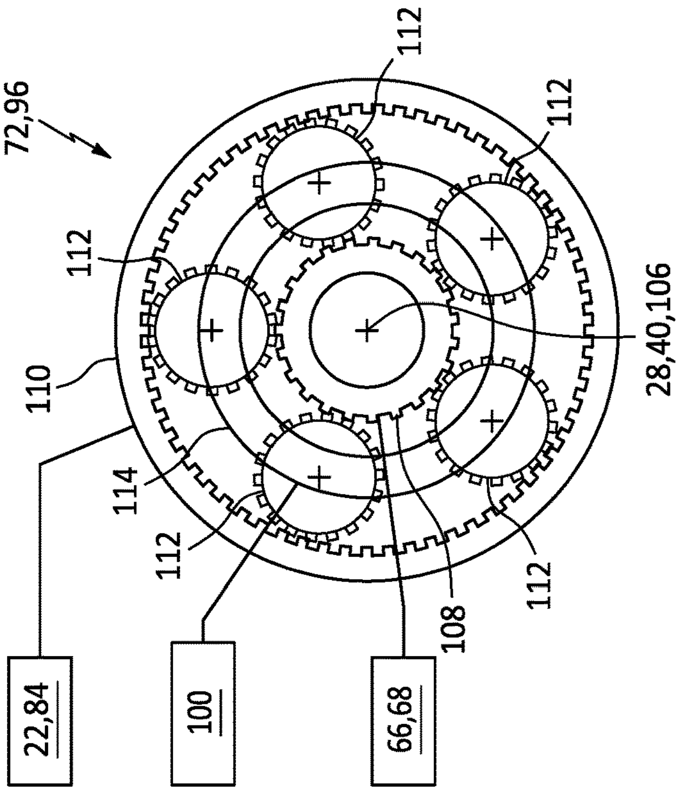
FIG. 4 is a schematic illustration of a second gear system of the geartrain coupled with various components of the aircraft propulsion system.

Referring to FIGS. 2 and 4, the second gear system 96 includes a second sun gear 108, a second ring gear 110, a plurality of second intermediate gears 112 and a second carrier 114. The second sun gear 108 is rotatable about the axis 28, 40, 106. The second ring gear 110 circumscribes the second sun gear 108 and the second intermediate gears 112. The second ring gear 110 is rotatable about the axis 28, 40, 106. The second intermediate gears 112 are arranged circumferentially about the axis 28, 40, 106 and the second sun gear 108 in an array. Each of the second intermediate gears 112 is disposed radially between and meshed with the second sun gear 108 and the second ring gear 110. Each of the second intermediate gears 112 is rotatably mounted to the second carrier 114. The second carrier 114 is rotatable about the axis 28, 40, 106. This second carrier 114 is coupled to (e.g., via an inter-gear system shaft and/or another coupling device) and rotatable with the first ring gear 100, where the second carrier 114 and the first ring gear 100 are configured to rotate at a common rotational velocity.

Referring to FIG. 2, the first propulsor rotor 22 is coupled to the geartrain 72 and its second gear system 96 through the second ring gear 110. The first propulsor shaft 84 (and/or another coupling device), for example, may couple the first propulsor rotor 22 to the second ring gear 110. The first propulsor shaft 84 of FIG. 2 extends between and is connected to the first propulsor rotor 22 and the second ring gear 110. The low speed rotating assembly 68 and its low speed shaft 66 are coupled to the geartrain 72 and its first gear system 94 through the first sun gear 98. The low speed rotating assembly 68 and its low speed shaft 66 are also coupled to the geartrain 72 and its second gear system 96 through the second sun gear 108. The first sun gear 98 and the second sun gear 108 of FIG. 2, for example, are each (e.g., independently) connected to the low speed rotating assembly 68 and its low speed shaft 66. With such an arrangement, the low speed rotating assembly 68 and its LPT rotor 60 are configured to (e.g., independently) drive rotation of the first sun gear 98 and the second sun gear 108, where the first sun gear 98, the second sun gear 108 and the LPT rotor 60 are rotate at a common rotational velocity.

The aircraft propulsion system 20 and its drivetrain 70 may include one or more brakes 116A and 116B (generally referred to as "116") and/or one or more lock devices 118A and 118B (generally referred to as "118"). The first brake 116A and/or the first lock device 118A may be located at a first location 120A, or another suitable location. The second brake 116B and/or the second lock device 118B may be located at a second location 120B, or another suitable location.

The second brake 116B of FIG. 2 is configured to brake (e.g., slow and/or stop) rotation of the second carrier 114 about the axis 28, 40, 106. The second lock device 118B is configured to lock (e.g., fix, prevent) rotation of the first ring gear 100 and the second carrier 114 about the axis 28, 40, 106, for example, following the braking of the second carrier 114 to a zero rotational speed about the axis 28, 40, 106 using the second brake 116B. When the second carrier 114 is rotationally fixed (e.g., during the second mode of operation of FIG. 5), a rotational speed of the first propulsor rotor 22 may decrease (compared to when the second carrier 114 is free to rotate).

Reducing the rotational speed of the first propulsor rotor 22 during, for example, the second mode of operation reduces or substantially eliminates (e.g., de minimis) the first direction propulsive thrust generated by the first propulsor rotor 22. Reducing first propulsor rotor thrust may, in turn, increase power available for driving rotation of the second propulsor rotor 24 and/or facilitate substantial second direction aircraft movement; e.g., without first direction aircraft movement. However, maintaining some rotation of the first propulsor rotor 22 may maintain lubrication of one or more bearings (e.g., bearings 122 in FIG. 2) supporting the first propulsor rotor 22 and/or prevent bearing related damage. For example, when a component supported by a bearing is not rotating, shock loads may damage one of more internal components of the bearing. Examples of such bearing damage may include, but are not limited to, brinelling and false brinelling. Maintaining some rotation of the first propulsor rotor 22 of FIG. 1 may also or alternatively prevent an exhaust backflow through the bypass flowpath 56 into the core inlet 42. Maintaining some rotation of the first propulsor rotor 22 may still also or alternatively prevent debris (e.g., sand, dirt, dust, etc.) from entering the core inlet 42 during the second mode of operation where the aircraft is more likely to be near the ground; e.g., for landing or takeoff.

The first brake 116A of FIG. 2 is configured to brake (e.g., slow and/or stop) rotation of the first carrier 104 about the axis 28, 40, 106. The first lock device 118A is configured to lock (e.g., fix, prevent) rotation of the first carrier 104 about the axis 28, 40, 106. With this arrangement, the geartrain 72 and its first gear system 94 and its second gear system 96 are configured to transfer additional power from the low speed rotating assembly 68 and its LPT rotor 60 to the first propulsor rotor 22 and any drivetrain element(s) therebetween (when included). This power transfer may be substantially all (e.g., minus losses in the drivetrain 70) of the power output from the low speed rotating assembly 68 and its LPT rotor 60 when the second propulsor rotor 24 is rotationally decoupled from the low speed rotating assembly 68; e.g., using the transmission 76 of FIG. 1. The geartrain 72 may thereby provide a multi-speed transmission between the low speed rotating assembly 68 and the first propulsor rotor 22, where a speed ratio between the low speed rotating assembly 68 and the first propulsor rotor 22 during the second mode is less than a speed ratio between the low speed rotating assembly 68 and the first propulsor rotor 22 during the first mode.

To enter the third mode of operation from the first mode of operation, the transmission 76 selectively couples the low speed rotating assembly 68 and the transmission output shaft 80 to transfer power from the LPT rotor 60 to the second propulsor rotor 24. Similarly, to enter the first mode of operation from the third mode of operation, the transmission 76 selectively uncouples the low speed rotating assembly 68 and the transmission output shaft 80 to remove power transfer from the LPT rotor 60 to the second propulsor rotor 24.

Figure 6:
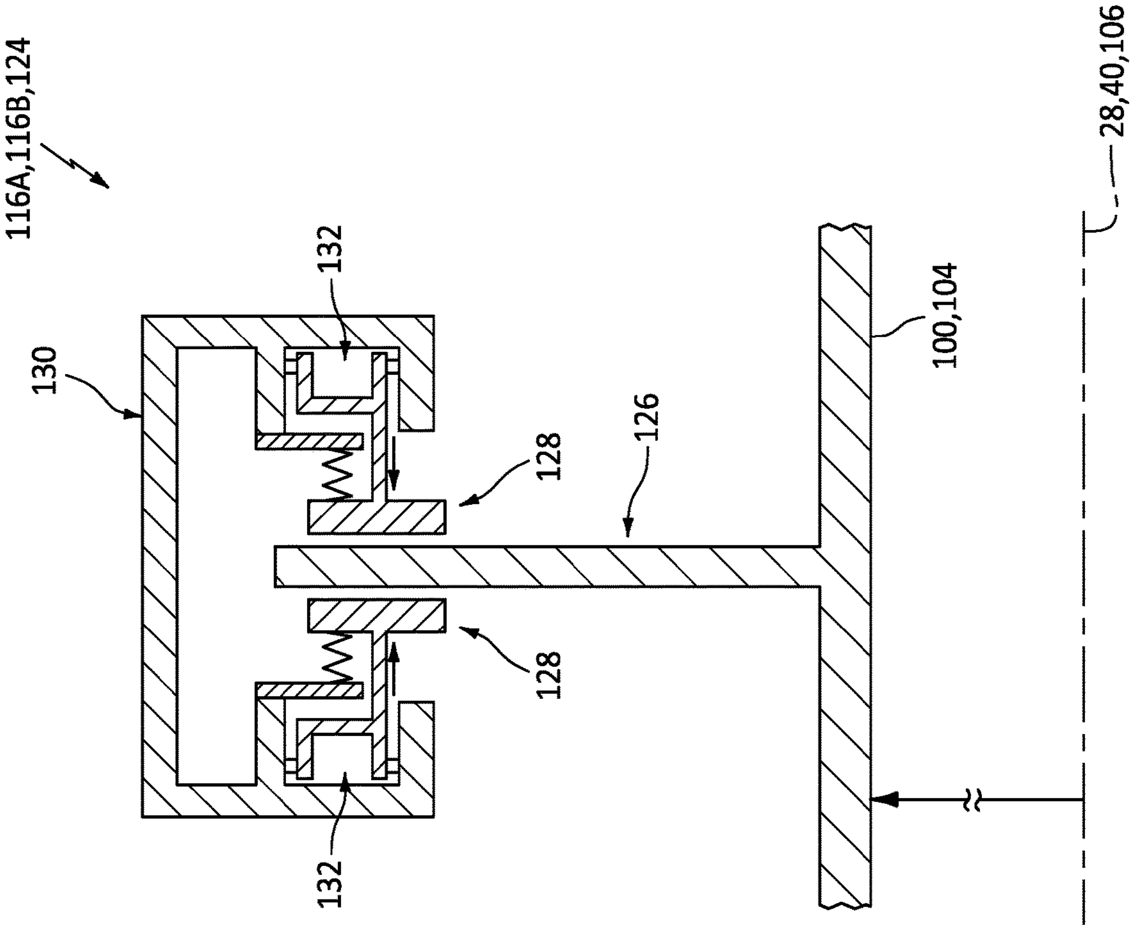
FIG. 6 is a partial, side sectional illustration of a rotating assembly configured with a brake.

Referring to FIG. 6, the first brake 116A and/or the second brake 116B may each be configured as or otherwise include a disk brake 124. The disk brake 124 of FIG. 6 includes a brake rotor 126 and one or more brake pads 128. The brake rotor 126 is configured rotatable with the respective geartrain member 104, 100. The brake rotor 126, for example, may be connected to and rotatable with the respective geartrain member 104, 100, or another rotating element (directly or indirectly) rotatable with the respective geartrain member 104, 100. The brake pads 128 are anchored to a stationary structure 130, which may be part of the engine housing 50 and/or an airframe of the aircraft (see FIG. 1). The brake pads 128 may be actuated by one or more brake actuators 132 (e.g., hydraulic brake actuators) to move the brake pads 128 from an open position to a closed position. In the open position, the brake pads 128 are spaced from and do not engage (e.g., contact) the brake rotor 126 (see position of FIG. 6). In the closed position, the brake pads 128 engage (e.g., contact) and clamp onto (e.g., squeeze) the brake rotor 126. Frictional rubbing between the brake pads 128 and the brake rotor 126 is operable to brake rotation of the brake rotor 126 and, thus, the respective geartrain member 104, 100 (or another rotating element) connected thereto. The first and the second brakes 116 of the present disclosure, however, are not limited to such an exemplary disk brake configuration. For example, it is contemplated the first and/or the second brake 116B may alternatively be configured as another type of brake such as a drum brake or a set of clutch plates.

Figure 7:
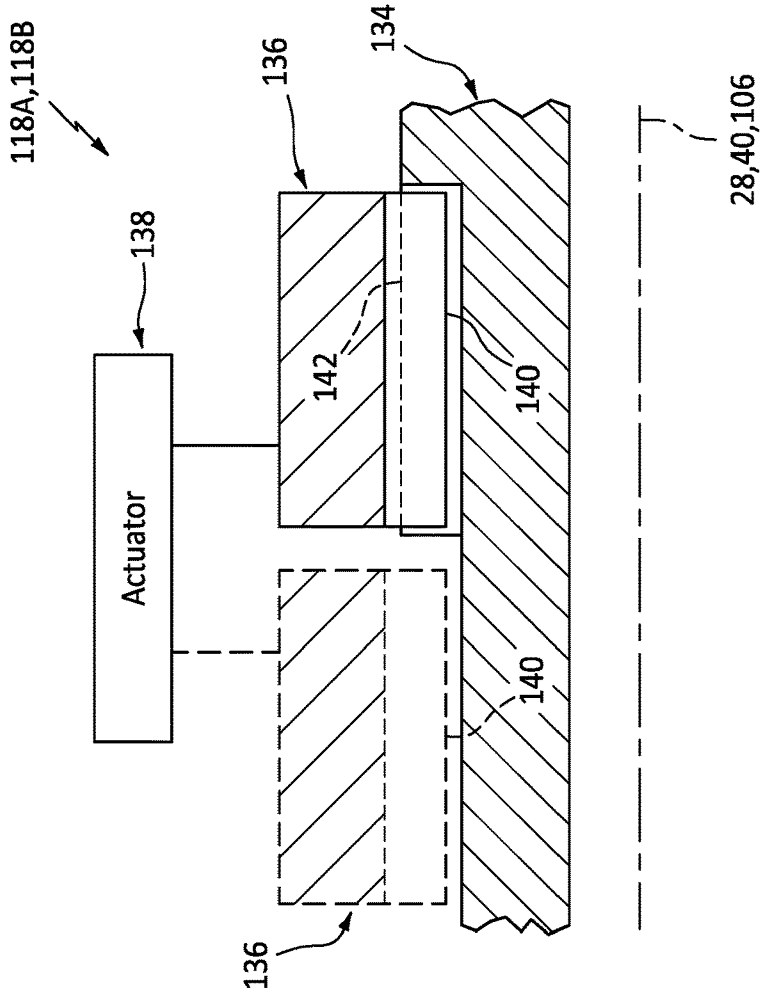
FIG. 7 is a partial, side sectional schematic illustration of a lock device.

Referring to FIG. 7, the first lock device 118A and/or the second lock device 118B may each be configured as a splined lock device; e.g., a splined coupling. The lock device 118 of FIG. 7, for example, includes an inner lock element 134 (e.g., a splined shaft), an outer lock element 136 (e.g., a splined sleeve) and an actuator 138. The inner lock element 134 is rotatable about the axis 28, 40, 106. The outer lock element 136 is rotationally fixed about the axis 28, 40, 106. However, the actuator 138 is configured to move (e.g., axially translate) the outer lock element 136 along the axis 28, 40, 106 and the inner lock element 134 between an unlocked position (see dashed line in FIG. 7) and a locked position (see solid line in FIG. 7; see also FIG. 8). At the unlocked position, inner splines 140 of the outer lock element 136 are disengaged (e.g., spaced) from outer splines 142 of the inner lock element 134. At the locked position, the inner splines 140 of the outer lock element 136 are engaged (e.g., meshed) with the outer splines 142 of the inner lock element 134 (see also FIG. 8). With this arrangement, when the lock device 118 is unlocked and its outer lock element 136 is in the unlocked position, the inner lock element 134 may rotate (e.g., freely, unencumbered by the outer lock element 136) about the axis 28, 40, 106. However, when the lock device 118 is locked and its outer lock element 136 is in the locked position of FIG. 8, the outer lock element 136 is meshed with the inner lock element 134 and prevents rotation of the inner lock element 134 about the axis 28, 40, 106.

Figure 8:
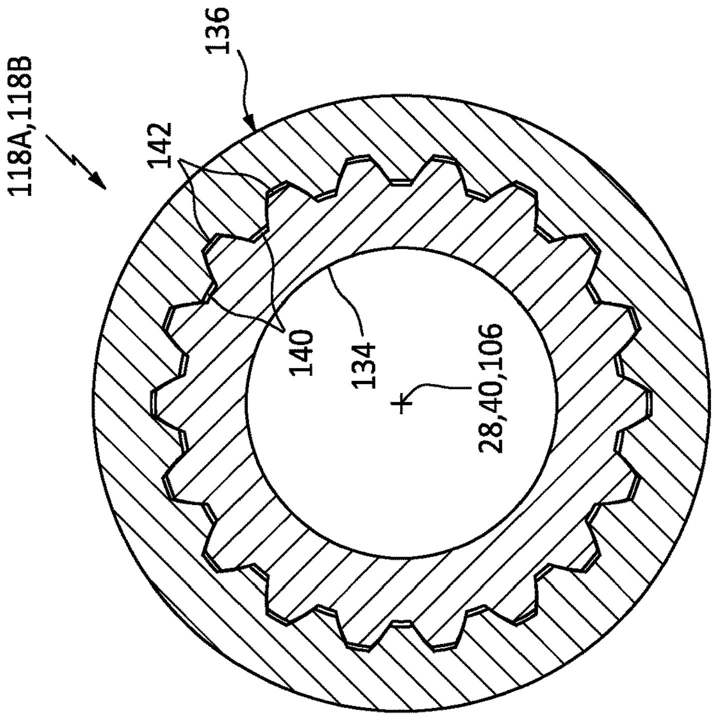
FIG. 8 is a cross-sectional illustration of the lock device of FIG. 7.

Referring to FIGS. 2 and 7, the inner lock element 134 of the first lock device 118A may be configured as part of or may be attached (directly or indirectly) to the first carrier 104, or any other element rotatable therewith. The inner lock element 134 of the second lock device 118B may be configured as part of or may be attached (directly or indirectly) to the first ring gear 100, or any other element rotatable therewith. While the inner lock element 134 of FIGS. 7 and 8 is described as the rotating element and the outer lock element 136 is described as the rotationally fixed element, the operation of these elements may be switched in other embodiments. In particular, the inner lock element 134 may alternatively be configured as the rotationally fixed element and axially translatable by the actuator 138, and the outer lock element 136 may be configured as the rotating element. Furthermore, various other types of rotational lock devices are known in the art, and the present disclosure is not limited to any particular ones thereof.

In some embodiments, referring to FIG. 2, the first sun gear 98 and the second sun gear 108 may each be independently connected (e.g., connected in parallel) to the low speed rotating assembly 68 and its low speed shaft 66. In other embodiments, however, the second sun gear 108 may be connected to the low speed rotating assembly 68 and its low speed shaft 66 through the first sun gear 98. The second sun gear 108, for example, may be rotationally fixed to the first sun gear 98. In still other embodiments, the first sun gear 98 may be connected to the low speed rotating assembly 68 and its low speed shaft 66 through the second sun gear 108. The first sun gear 98, for example, may be rotationally fixed to the second sun gear 108.

In some embodiments, referring to FIG. 2, the low speed rotating assembly 68 and its low speed shaft 66 may be connected to the transmission 76 (see FIG. 1) and, thus, the second propulsor rotor 24 independent of (e.g., in parallel with) geartrain 72. In other embodiments, however, the transmission 76 and, thus, the second propulsor rotor 24 may be coupled to the low speed rotating assembly 68 and its low speed shaft 66 through the first sun gear 98 or the second sun gear 108, but not though the rest of the first gear system 94 and the second gear system 96. Thus, while power may be transferred from the low speed rotating assembly 68 to the second propulsor rotor 24 through the sun gear(s) 98 and/or 108, the output from the geartrain 72 to the transmission 76 may still rotate with the low speed rotating assembly 68 at a common rotational velocity.

In some embodiments, referring to FIG. 2, the aircraft propulsion system 20 may include an auxiliary turbine 144. This auxiliary turbine 144 is configured to (e.g., help) drive rotation of the first propulsor rotor 22 during, for example, switching from the second to the first mode of operation. The auxiliary turbine 144 may be configured as an air turbine, a free turbine or any other type of turbine powered by (e.g., driven by) gas bled from the engine core 26. The aircraft propulsion system 20 of FIG. 2, for example, includes a bleed circuit 146 and an exhaust circuit 148 for the auxiliary turbine 144. The bleed circuit 146 is configured to bleed gas (e.g., compressed air) from the core flowpath 86, and provide the bleed gas (e.g., the bleed air) to an inlet of the auxiliary turbine 144. The bleed circuit 146 may bleed the gas from the compressor section 46 (or alternatively another section of the engine core 26 of FIG. 1). The exhaust circuit 148 is configured to receive expanded bleed gas from an outlet (e.g., an exhaust) of the auxiliary turbine 144, and direct that exhausted bleed gas into a flowpath of the aircraft propulsion system 20 (e.g., the bypass flowpath 56 or the core flowpath 86). Alternatively, the exhaust circuit 148 may direct the exhausted bleed gas directly into an environment outside of the aircraft propulsion system 20. The present disclosure, however, is not limited to the foregoing exemplary bleed circuit and/or exhaust circuit configurations.

The auxiliary turbine 144 of FIG. 2 includes a bladed auxiliary turbine rotor 150; e.g., an air turbine rotor. This auxiliary turbine rotor 150 includes a plurality of turbine blades arranged circumferentially around and connected to one or more respective rotor disks (or hubs). The turbine rotor blades, for example, may be formed integral with or mechanically fastened, welded, brazed and/or otherwise attached to the respective rotor disk(s) (or hub(s)). The auxiliary turbine 144 may be configured as an axial flow turbine or a radial flow turbine, and the auxiliary turbine 144 may include one or more stages; e.g., rows/arrays of its turbine blades.

Figure 5:
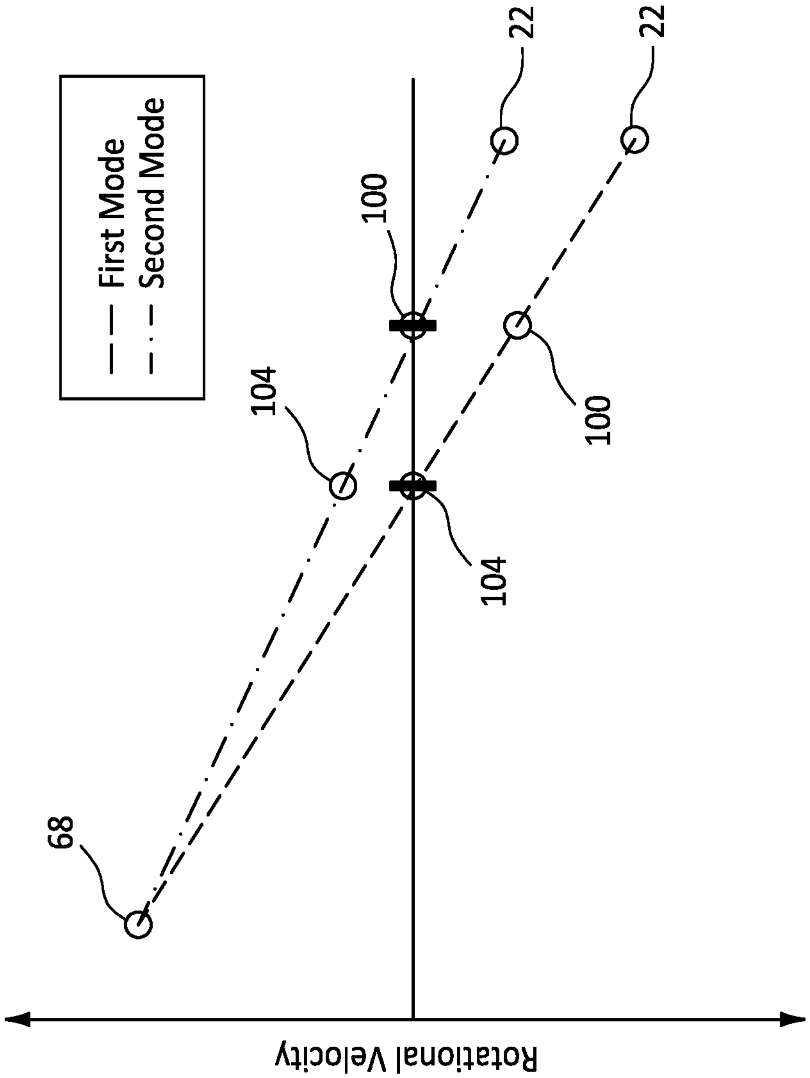
FIG. 5 is a graph depicting changes to rotational speeds during various modes of propulsion system operation.

To enter the third mode of operation from the second mode of operation, the second lock device 118B may be disengaged and/or the second brake 116B may be released (if currently applied) to permit rotation of the second carrier 114; also the first brake 116A may be applied and/or the bleed circuit 146 may be opened to power the bladed auxiliary turbine rotor 150 to increase the rotational speed of the first propulsor rotor 22 and while also reducing the rotational speed of the first carrier 104 toward zero (see FIG. 5). When the rotation of the first carrier 104 has stopped, the first lock device 118A may be engaged to prevent subsequent rotation. The drivetrain 70 may transfer (e.g., all, minus losses in the drivetrain 70) the power output from the low speed rotating assembly 68 and its LPT rotor 60 to (a) the first propulsor rotor 22 and the drivetrain element(s) therebetween and (b) the second propulsor rotor 24 and the drivetrain element(s) therebetween (e.g., independent of the geartrain 72 and its first gear system 94 and its second gear system 96).

Similarly, to enter the second mode of operation from the third mode of operation, the first lock device 118A may be disengaged and/or the first brake 116A may be released (if currently applied) to permit rotation of the first carrier 104; also the second brake 116B may be applied to reduce the rotational speed of the second carrier 114 toward zero (see FIG. 5). When the rotation of the second carrier 114 has stopped, the second lock device 118B may be engaged to prevent subsequent rotation.

To enter the second mode of operation from the first mode of operation, the combined steps of changing from the first mode to the third mode and from the third mode to the second mode may be done concurrently or in series.

Similarly, to enter the first mode of operation from the second mode of operation, the combined steps of changing from the second mode to the third mode and from the third mode to the first mode may be done concurrently or in series.

When transitioning into at least the first mode of operation, the auxiliary turbine 144 may be used to facilitate operation of the lock devices 118. For example, where the lock devices 118 are disengaged (e.g., unlocked) during the switching of modes of operation, both the first propulsor rotor 22 and the second propulsor rotor 24 may be rotating. To facilitate engagement of the first lock device 118A, the auxiliary turbine 144 of FIG. 2 is operated to drive rotation of the first propulsor rotor 22/the second ring gear 110 about the axis 28, 40, 106. The auxiliary turbine 144 may thereby increase the rotational speed of the second ring gear 110 to drive the rotational speed of the first carrier 104 towards (e.g., down to) a zero rotational speed. Once the first carrier 104 is at a zero rotational speed about the axis 28, 40, 106 (e.g., rotationally fixed), the first lock device 118A may be engaged. The auxiliary turbine 144 may then be turned off (e.g., the bleed gas may be cutoff), and the first lock device 118A may maintain the first carrier 104 rotationally fixed.

Figure 9:
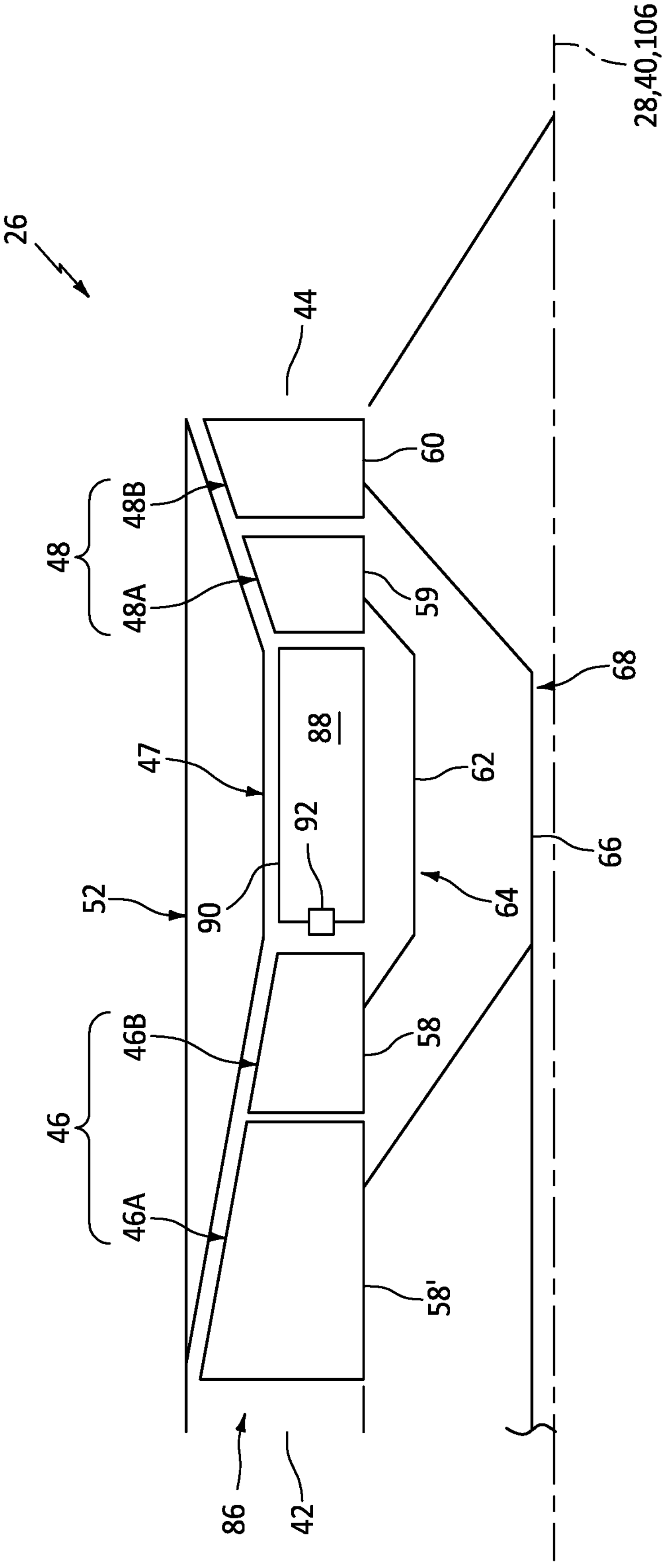
FIG. 9 is a partial, schematic illustration of a gas turbine engine core.

In some embodiments, referring to FIG. 1, the low speed rotating assembly 68 may be configured without a compressor rotor. In other embodiments, referring to FIG. 9, the low speed rotating assembly 68 may include a low pressure compressor (LPC) rotor 58' arranged within a low pressure compressor (LPC) section 46A of the compressor section 46. In such embodiments, the compressor rotor 58 may be a high pressure compressor (HPC) rotor 58 within a high pressure compressor (HPC) section 46B of the compressor section 46.

Figure 10:
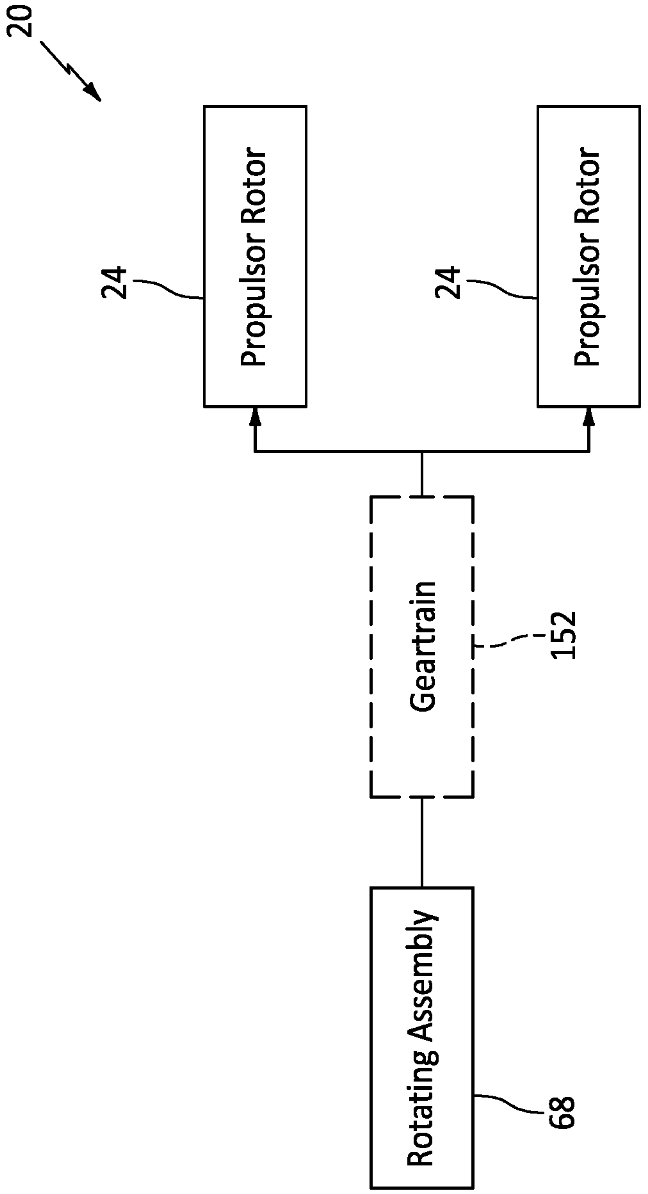
FIG. 10 is a partial, schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIGS. 1 and 9), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsor rotors 22 and 24, or a single one of the propulsor rotors 22, 24 and/or one or more other mechanical loads; e.g., electric machines, electric generators, electric motors, etc. The aircraft propulsion system 20, for example, may include two or more of the first propulsor rotors 22 and/or two or more of the second propulsor rotors 24. For example, the aircraft propulsion system 20 of FIG. 10 includes multiple second propulsor rotors 24 rotatably driven by the low speed rotating assembly 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating assembly 68 through a power splitting geartrain 152.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure.

Accordingly, the present disclosure is not to be restricted except in light of the attached claims and their equivalents.

What is claimed is:

1. An assembly for an aircraft, comprising:

a geartrain including a first gear system and a second gear system;

the first gear system including a first sun gear, a first ring gear, a plurality of first intermediate gears and a first carrier, the first sun gear rotatable about a first axis, the first ring gear circumscribing the plurality of first intermediate gears, the first ring gear rotatable about the first axis, the plurality of first intermediate gears radially between and meshed with the first sun gear and the first ring gear, each of the plurality of first intermediate gears rotatably mounted to the first carrier;

the second gear system including a second sun gear, a second ring gear, a plurality of second intermediate gears and a second carrier, the second sun gear rotatable about the first axis with the first sun gear, the second ring gear circumscribing the plurality of second intermediate gears and rotatable about the first axis, the plurality of second intermediate gears radially between and meshed with the second sun gear and the second ring gear, each of the plurality of second intermediate gears rotatably mounted to the second carrier, and the second carrier coupled to the first ring gear;

a first propulsor rotor coupled to the second ring gear and rotatable about the first axis;

a second propulsor rotor rotatable with a rotating assembly, the rotating assembly coupled to the second propulsor rotor through a transmission independent of the geartrain, the second propulsor rotor rotatable about a second axis angularly offset from the first axis, the transmission configured to selectively couple the second propulsor rotor to the rotating assembly, and the second propulsor rotor configured as an open rotor;

a brake configured to brake rotation of the first ring gear about the axis, the brake comprising a brake rotor and one or more brake pads, and the brake rotor is configured rotatable with the first ring gear;

the rotating assembly coupled to the first sun gear and comprising a turbine rotor, the rotating assembly configured to drive rotation of the first propulsor rotor through the geartrain, and the rotating assembly configured to drive rotation of the second propulsor rotor; and the geartrain is arranged along the first axis between the second propulsor rotor and the turbine rotor.

2. The assembly of claim 1, further comprising a lock device configured to lock rotation of the first ring gear about the first axis.

3. The assembly of claim 1, wherein the first carrier is rotatable about the first axis.

4. The assembly of claim 3, further comprising a lock device configured to lock rotation of the first carrier about the first axis.

5. The assembly of claim 1, further comprising:

an auxiliary turbine comprising an auxiliary turbine rotor;

the auxiliary turbine rotor coupled to and configured to drive rotation of the second ring gear.

6. The assembly of claim 1, wherein the rotating assembly is independently coupled to the first sun gear and the second sun gear.

7. The assembly of claim 1, wherein the rotating assembly is configured to drive rotation of the first sun gear and the second sun gear at a common rotational velocity as the turbine rotor.

8. The assembly of claim 1, further comprising:

an engine core including a compressor section, a combustor section, a turbine section and the rotating assembly;

the turbine section comprising the turbine rotor.

9. The assembly of claim 1, further comprising a second brake configured to brake rotation of the second carrier about the first axis.

10. The assembly of claim 1, wherein the transmission is arranged along the first axis between the second propulsor rotor and the geartrain.

11. An assembly for a vertical take-off and landing aircraft, comprising:

a geartrain including a first gear system and a second gear system;

the first gear system including a first sun gear, a first ring gear, a plurality of first intermediate gears and a first carrier, the first sun gear rotatable about an axis, the first ring gear circumscribing the plurality of first intermediate gears, the plurality of first intermediate gears radially between and meshed with the first sun gear and the first ring gear, each of the plurality of first intermediate gears rotatably mounted to the first carrier;

the second gear system including a second sun gear, a second ring gear, a plurality of second intermediate gears and a second carrier, the second sun gear rotatable about the axis, the second ring gear circumscribing the plurality of second intermediate gears and rotatable about the axis, the plurality of second intermediate gears radially between and meshed with the second sun gear and the second ring gear, each of the plurality of second intermediate gears rotatably mounted to the second carrier, and the second carrier coupled to and rotatable with the first ring gear through a coupling device;

a first propulsor rotor coupled to the second ring gear and rotatable about a first axis;

a second propulsor rotor rotatable about a second axis angularly offset from the first axis;

a rotating assembly of the vertical take-off and landing aircraft comprising a turbine rotor, the rotating assembly configured to drive rotation of the first propulsor rotor through the geartrain where the first sun gear and the second sun gear rotate at a common rotational velocity as the turbine rotor, and the rotating assembly configured to drive rotation of the second propulsor rotor independent of the geartrain; and the second propulsor rotor is arranged along the first axis upstream of the geartrain and the turbine rotor.

12. The assembly of claim 11, wherein the rotating assembly further comprises a shaft independently coupled to the first sun gear and the second sun gear.

13. The assembly of claim 11, wherein the coupling device is an inter-gear system shaft.

14. An assembly, comprising:

a geartrain including a first gear system and a second gear system;

a propulsor rotor for an aircraft propulsion system, the propulsor rotor rotatable with a rotating assembly, the rotating assembly coupled to the second propulsor rotor through a transmission independent of the geartrain, the second propulsor rotor rotatable about a propulsor rotor axis, the rotating assembly rotatable about an axis, the propulsor rotor axis offset from the axis, and the transmission configured to selectively couple the propulsor rotor to the rotating assembly;

the first gear system including a first sun gear, a first ring gear, a plurality of first intermediate gears and a first carrier, the first sun gear rotatable about an axis, the first ring gear circumscribing the plurality of first intermediate gears, the plurality of first intermediate gears radially between and meshed with the first sun gear and the first ring gear, each of the plurality of first intermediate gears rotatably mounted to the first carrier;

the second gear system including a second sun gear, a second ring gear, a plurality of second intermediate gears and a second carrier, the second sun gear rotatable about the axis, the second ring gear circumscribing the plurality of second intermediate gears and rotatable about the axis, the plurality of second intermediate gears radially between and meshed with the second sun gear and the second ring gear, each of the plurality of second intermediate gears rotatably mounted to the second carrier, the second carrier coupled to the first ring gear through an inter-gear system, and the second carrier rotatable about the axis;

a power output coupled to the geartrain through the second ring gear, the power output comprising a bladed rotor for the aircraft propulsion system; and a power input coupled to the geartrain through the first sun gear and/or the second sun gear, the power input comprising the rotating assembly, the power input configured to drive rotation of the power output through the geartrain, and the power input arranged along the axis downstream of the propulsor rotor.

15. The assembly of claim 14, further comprising:

a drivetrain comprising the geartrain;

the first ring gear configured to rotate about the axis during a first mode, and the first carrier configured to rotate about the axis during a second mode;

the drivetrain configured to stop rotation of the first carrier during the first mode, and the drivetrain configured to stop rotation of the first ring gear during the second mode; and the power input configured to drive the rotation of the power output through the geartrain during the first mode and the second mode.

16. The assembly of claim 14, wherein the power output comprises a bladed rotor for an aircraft propulsion system.

* * * * *